Aug. 11, 1970  A. P. FENTON  3,523,592
ENGINE LUBRICATION SYSTEM
Filed July 26, 1968
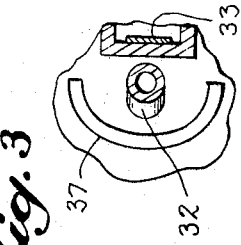
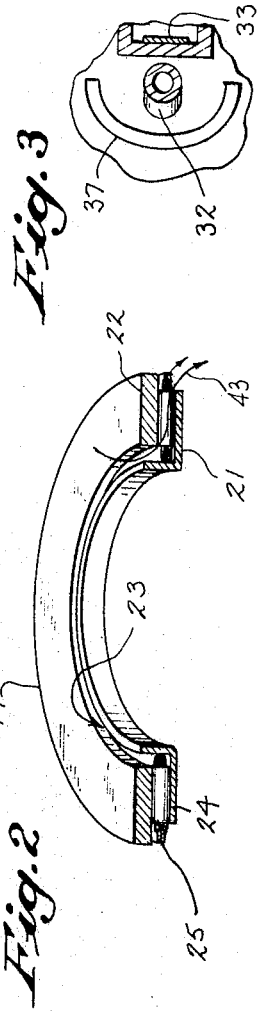
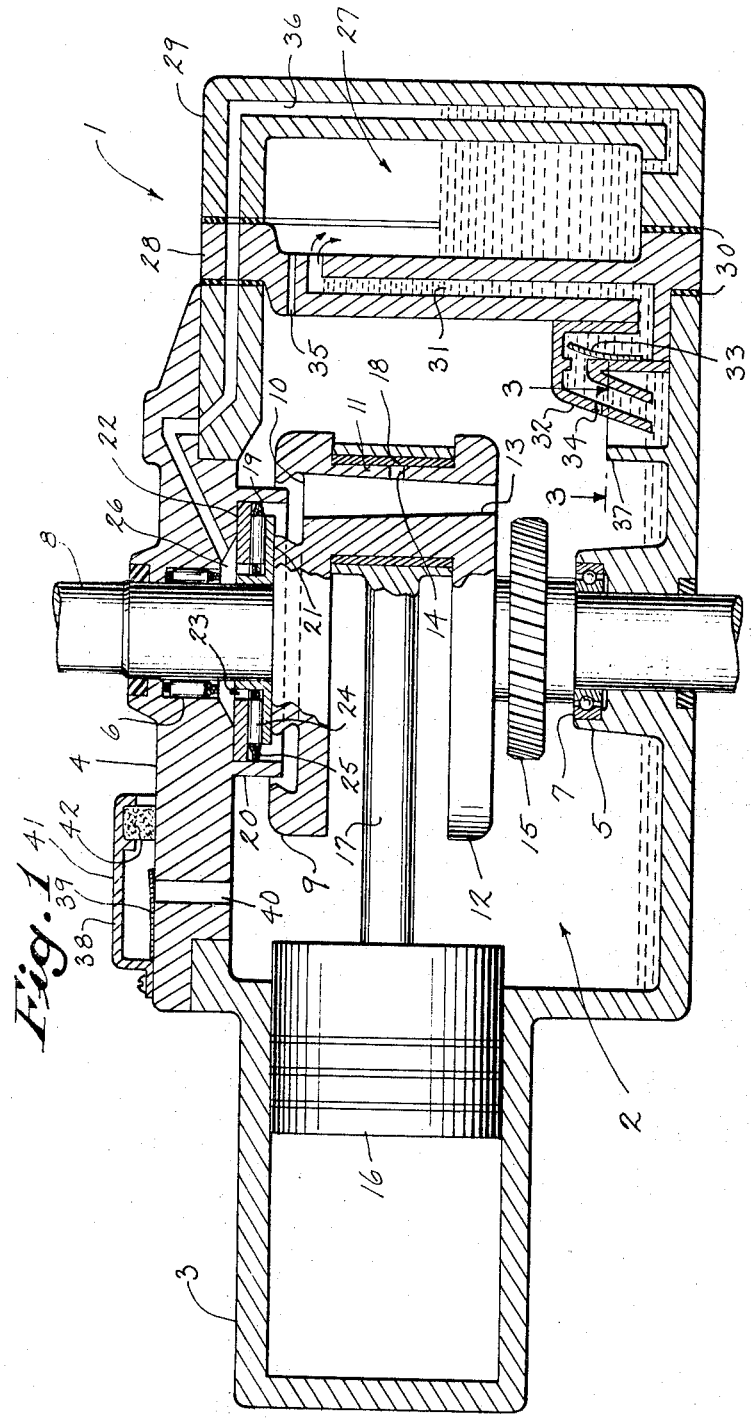
INVENTOR
ALVIN P. FENTON
BY
ATTORNEY

United States Patent Office 3,523,592
Patented Aug. 11, 1970

3,523,592
ENGINE LUBRICATION SYSTEM
Alvin P. Fenton, Kohler, Wis., assignor to Kohler Co.,
Kohler, Wis., a corporation of Wisconsin
Filed July 26, 1968, Ser. No. 747,859
Int. Cl. F16n 7/36; F01m 1/00
U.S. Cl. 184—6                                    9 Claims

ABSTRACT OF THE DISCLOSURE

A lubrication system for a reciprocating internal combustion engine. The reciprocating movement of an engine piston develops pulsating pressures within the engine crankcase. These pressures are utilized to force lubricating oil collecting in a sump at the bottom of the crankcase through an inlet passage having a check valve to a separate oil reservoir, and to also force the lubricating oil from the reservoir through an outlet passage to an area above a thrust bearing located at the top of the crankshaft. The thrust bearing acts as a centrifugal pump to convey lubricating oil to certain vital engine parts that are to be lubricated and to prevent a reverse flow of oil back to the reservoir.

BACKGROUND OF THE INVENTION

This invention relates to lubrication systems for reciprocating internal combustion engines, and more particularly to such systems whose operation is based on the pressure differences created within the engine crankcase by the movements of the engine piston. In single cylinder engines, the movement of the piston to bottom dead center position creates a positive pressure within the crankcase that will exceed atmospheric pressure, and movement of the piston to top dead center decreases internal crankcase pressure, so that it drops to a value below atmospheric pressure. Hence, a pulsating internal pressure is developed in the crankcase that may be, and in some designs has been utilized for conveying lubricating oil within the crankcase to vital engine parts that must be lubricated.

In vertical crankshaft engines lubricating oil is normally collected in a sump forming the bottom of the crankcase. In the utilization of pulsating pressures in this form of engine, for producing a flow of the oil, it has been a practice to have the positive pressure pulses drive oil upward through a hollow camshaft, such camshaft paralleling the main crankshaft so as also to be in a vertical orientation. At the top of the camshaft a cavity is provided to receive the oil and a certain amount of air that becomes compressed within the cavity. From this cavity a passage leads to the top of the crankshaft, and during negative pressure pulses within the crankcase a combination of the low pressure and the pressure previously built up within the cavity causes some oil to flow from the cavity to the top of the crankshaft. From this point, the oil then passes down the crankshaft and is dispersed to vital engine parts requiring lubrication. The oil then is recollected in the sump, where a substantial supply of oil is maintained at all times.

In the lubrication system just described, porting is required at the top and bottom of the camshaft, to trap oil moving up the shaft and to prohibit a reverse flow in the shaft back to the sump. Also, the sump forms a reservoir of substantial depth that adds to the vertical dimensions of both the crankcase and the engine crankshaft. The bearings supporting the crankshaft are consequently spaced farther apart than may be desired, with the undesirable result that transverse moments acting upon the crankshaft may be unnecessarily large.

It is also known to lubricate reciprocating engines by mounting a rotating vane within the region of the sump at the botom of the crankcase, which vane dips into the oil and slings it upward in the crankcase against the vital engine parts that are to be lubricated. Also, separate pumps may be employed for conveying the lubricating oil. There are a number of disadvantages with these arrangements. For example, as in the aforedescribed prior art system, the engine's physical dimensions can be unnecessarily large, an added oil pump is costly, there is an increased chance of mechanical failure, and unbalanced shaking forces on the engine may be developed.

SUMMARY OF THE INVENTION

There is provided in the present invention a lubrication system for a reciprocating internal combustion engine that has a lubricating oil reservoir distinct from the interior of the engine crankcase that receives oil from the bottom of the crankcase through a first passage which contains a check valve that blocks reverse flow back to the crankcase, which feeds oil through a second passage to a region in the upper part of the crankcase. In a preferred form, a means is interposed between this region and the crankcase interior which prevents reverse flow of the oil back to the reservoir, and from this means the oil is conveyed to the engine parts to be lubricated. Such means may comprise a bearing for the crankshaft in which the bearing elements act as a centrifugal pump that forces the oil in one direction and prevents a reverse flow in the opposite direction back to the reservoir.

The invention utilizes the pulsating crankcase pressures developed by the reciprocating engine piston. During positive pressure pulses the pressure developed within the crankcase forces oil lying in the bottom of the crankcase to flow through a first passage upwardly to the top of a reservoir. Pressure is also developed in the reservoir which urges oil flow from an outlet passage at the bottom of the reservoir to a region in the upper part of the crankcase which surrounds the crankshaft. Preferably, a thrust bearing for the crankshaft divides the region to which the outlet passage feeds oil from the principal interior of the crankcase. This bearing functions as a centrifugal pump in which oil enters the radially inner side of the bearing and is slung radially outward by the bearing elements through the action of centrifugal force developed by the rotating bearing elements. Such bearing thus acts as a pump which only will allow oil to pass in one direction, so that it is inhibited from returning to the reservoir, and so that it is forcibly pumped to engine parts to be lubricated.

The movement of the oil from the reservoir to the thrust bearing, and hence to the parts to be lubricated, is augmented by the negative, or low pressure values in the crankcase occurring during piston travel toward top dead center position. The low pressure pulses thus combine with the pressure built up and maintained in the reservoir, and with the centrifugal pumping forces of the thrust bearing, to positively deliver oil to the moving engine parts.

The invention is of particular advantage in that the bottom of the crankcase need not serve as a sump for holding a reserve of lubricating oil. The height of the crankcase may thus be reduced, thereby providing a more compact engine in respect of the dimension of height. The crankshaft, which in a vertical shaft engine is normally journaled in the top and bottom walls of the crankcase, can be shortened. Hence, with the bearings supporting the shaft closer to one another transverse moments can be reduced to enhance the smoothness of engine operation.

The invention eliminates the need of vanes for slinging oil about the crankcase interior, which work the oil to an unnecessary degree. Auxiliary oil pumps are also eliminated, and there is an advantageous reduction in moving parts. The provision of hollow camshafts and pressure cavities at the top of such camshafts, together with ports that open and close in timed relation to piston movement, as in prior lubrication systems utilizing pulsating pressures developed by a pumping action of the engine piston are eliminated. As a result the invention provides an improved engine lubrication system, and the invention can be used, with modification, in horizontal shaft engines as well as vertical shaft engines.

Other objects of the present invention are to provide an engine lubrication system that will permit a vertical shaft engine to be operated in inclined positions without impairing lubrication, to reduce shaking forces, and, in general, to provide an engine lubrication system having the foregoing features and advantages which is reliable while still being relatively simple and inexpensive to manufacture and assemble. Other objects and advantages will become apparent from the following description, in which description there is shown by way of illustration and not of limitation a preferred embodiment of the invention.

DESCRIPTION OF THE DRAWING

FIG. 1 is a side view in section of an internal combustion engine embodying the lubrication system of the present invention.

FIG. 2 is an enlarged perspective view in section of a roller type thrust bearing that forms a part of the engine of FIG. 1, and FIG. 3 is a plan view taken on the plane 3—3 indicated in FIG. 1 of a baffle provided on the floor of the engine crankcase.

DESCRIPTION OF THE PREFERRED EMBODIMENT

Referring to the drawing, there is shown in FIG. 1 a reciprocating internal combustion engine 1 having a lubrication system in which the heretofore stated advantages of the invention are provided. The engine 1 includes an enclosed crankcase 2 that communicates with a cylinder 3 at one side of the engine. The cylinder 3 has usual valving for introducing fuel and discharging products of combustion, but since these parts of the engine are not a part of the present invention valves, valve operating mechanism and an ignition system are not shown in the drawing. The crankcase 2 includes an upper bearing plate 4 and an internal boss 5, which parts 4 and 5 mount vertically spaced anti-friction bearings 6 and 7 in which there is journaled a vertical crankshaft 8.

The portion of the vertical crankshaft 8 between the bearings 6, 7 extends through the interior of the crankcase 2, and this portion comprises an upper counterweight 9 having an annular cavity 10 in its upper surface that is of a cognac-glass shape when viewed in cross section, an offset cylindrical crankpin 11, and a lower counterweight 12, all of which component parts are integral with one another. A tapered hole 13 extends downward from the cavity 10 through the crankpin 11 and lower counterweight 12 to open upon the underside of such counterweight. A small port 14 branches radially outward from the hole 13 to the outer surface of the crankpin 11. Mounted on the crankshaft 8 at a position between the lower counterweight 7 and the bearing 7 is a crankgear 15. The crankgear 15 is in driving relation to the usual camgear, and since such camgear and the accompanying camshaft and cam operating elements are not a part of the invention they are not shown in the drawing.

A piston 16 is mounted for reciprocating movement in the cylinder 3, and is joined by a connecting rod 17 to the crankpin 11. A connecting rod sleeve bearing 18 is disposed within connecting rod 17, and its bearing surface is in communication with the lubricating port 14. In the position show in FIG. 1, the piston 16 is at bottom dead center, and as is customary the top dead center position is reached when the piston 16 approaches the head of the cylinder 3.

A thrust bearing 19 for the crankshaft 8 is mounted on the underside of the upper bearing plate 4, and as seen in FIG. 1 the thrust bearing 19 is fitted within a circular oil deflecting skirt 20 which is an intergral part of the bearing plate 4. The construction of the thrust bearing 19 is more clearly shown in FIG. 2, and as seen therein the bearing 19 has an inner race 21 that is L-shaped in cross section. The inner flange of the L-shaped race 21 tightly receives the crankshaft 8 to rotate therewith, and disposed above and offset slightly radially from the race 21 is an outer race 22 of rectangular cross section. The inner diameter of the outer race 22 is greater than the diameter of the flange of the L-shaped race 21, to form an annular gap 23 between the two races 21, 22. A plurality of needle rollers 24 are disposed between the races 21, 22 and are held circumferentially in slightly spaced position from one another by spacer elements 25. Referring back to FIG. 1, it is seen that the thrust bearing 19 and the bottom side of the bearing plate 4 define a small, frusto-conical region 26 that surrounds the crankshaft 8 and is located above the bearing 19, such region being separated from the interior proper of the crankcase 2 by the intermediary of the bearing 19.

A reservoir 27 for holding lubricating oil is positioned on the side of the engine 1 opposite the cylinder 3. The reservoir 27 is comprised of an inner shell 28, that also serves as a part of the crankcase 2, and an outer shell 29, and appropriate gaskets 30 are provided between the parts to prevent leakage from the crankcase 2 and reservoir 27. To provide entry of oil from the bottom of the crankcase 2, which bottom region may be termed a shallow sump, to the oil reservoir 27 an inlet passage 31 of somewhat tortuous configuration is provided. This passage 31 has a short upwardly rising intake duct 32 with an inlet opening that is slightly above the bottom surface of the crankcase. The passage then turns downward, and then again upwardly through the wall of the inner shell 28 to open upon the upper part of the reservoir 27. In the downward portion of the passage 31 is a reed type check valve 33 that only permits flow toward the reservoir 27, and the intake duct 32 is provided with a small air hole 34 that is on the intake side of the reed valve 33. An air hole 35 is provided in the shell 28 above the maximum level of oil in the reservoir 27. This hole 35 communicates between the reservoir 27 and crankcase 2 to allow bleeding off of air in the reservoir back to the crankcase 2, for the purpose of regulating the buildup of pressure in the reservoir.

The outer shell 29 of the reservoir 27 is provided with an internal outlet passage 36 leading upward from the bottom of the reservoir 27 to the top of the shell 29, and the passage 36 then continues horizontally to exit into the region 26 above the thrust bearing 19.

As shown in FIG. 1, and particularly in FIG. 3, a curved baffle 37 is provided on the interior bottom floor of the crankcase 2 adjacent the oil intake duct 32. This baffle partially surrounds the duct 32 to collect and hold oil descending in the crankcase 2 to develop an adequate pool of oil at the duct 32 when the engine 1 is tilted from the normal, vertical position.

Referring again to FIG. 1, a one-way breather valve 38 is provided on the bearing plate 3 that has a reed 39 which opens and closes a port 40 leading from the crankcase interior. The reed 39 opens and closes the port 40 in response to the pressure level in the crankcase interior, and a cover 41 and suitable filter 42 is provided for protection of the reed 39.

In the operation of the engine lubrication system described and shown herein, the instantaneous air pressure in the crankcase 2 rises and falls in repsonse to the reciprocating movement of the piston 16, and hence the piston 16 performs a pumping function with respect to the interior of the crankcase 2 that develops cyclic, pulsating pressures. As the piston 16 moves to the bottom dead center position shown in FIG. 1, the crankcase pressure increases to its maximum value, which exceeds atmospheric pressure, and during such a positive pulse the reed 39 of the breather valve 38 may open to bleed some air to the atmosphere. When the piston 16 moves to its top dead center position crankcase pressure decreases to below atmospheric pressure and such negative pulses are not accompanied by any return of atmospheric air into the crankcase, so that as a result there is maintained an average negative air pressure, or partial vacuum in the crankcase 2 with respect to the atmosphere.

During a positive pressure pulse, occurring each time the piston 16 approaches its bottom dead center position, the pressure in the crankcase 2 will usually exceed the pressure within the reservoir 27. This increased crankcase pressure then forces lubricating oil, that has accumulated in the crankcase to a level above the opening of the intake duct 32, upward through the duct 32 and past the check valve 33. Some air may be bled into the oil through the small hole 34 provided in the intake duct 32, and the oil and entrapped air is then forced under pressure through the inlet passage 31 to enter the reservoir 27 at a point above the level of the body of lubricating oil held within the reservoir. The air that is delivered into the reservoir helps to develop and maintain a positive pressure within the reservoir 27, and to govern this pressure level the hole 35 is provided through which air may return to the crankcase 2, to prohibit an excessive pressure buildup over a period of engine operation.

As the piston 16 moves towards its top dead center position the instantaneous pressure within the crankcase 2 decreases, creating a partial vacuum as previously explained. During such a negative pressure pulse the check valve 33 functions to prevent oil from being drawn from the passage 31 and reservoir 27 back into the crankcase 2, and also to maintain a pressure differential between the oil reservoir 27 and the crankcase 2.

Also, during a negative pulse the pressure in the reservoir 27 and the partial vacuum in the crankcase 2 combines to convey oil out of the reservoir 27 and through the outlet passage 36 to the region 26 above the thrust bearing 19.

The thrust bearing 19 acts as a centrifugal pump and oil slinger to propel oil out of the region 26 and against the inner surface of the deflecting skirt 20, from which it drops into the cavity 10 in the top surface of the upper counterweight 9 of the crankshaft 8. The action of the thrust bearing is such that the oil enters the bearing by passing downward into the gap 23. The oil then is struck by the rotating bearing elements 24 to be rotated therewith. The centrifugal force that then acts upon the oil propels the oil radially outward between the elements 24 and through the bearing in a path as indicated by the arrows 43 in FIG. 2. The result is that the bearing pumps the oil in one direction, and precludes the oil from returning to the region 26 or the passageway 36 during peak pressure pulses that cyclically occur in the crankcase 2. Hence, the bearing 19 acts as a one-way, no-return oil conveying means interposed between the outlet of the reservoir 27 and the crankcase interior to both convey oil in the desired direction and to inhibit unwanted reverse flow that may otherwise occur.

Oil collecting in the cavity 10 flows into the tapered hole 13 in the crankpin 11. Some of the oil flowing downward in the hole 13 is spun radially outward by centrifugal force, created by the rotaation of the crankpin 11 about the vertical axis of crankshaft 4, through the crankpin port 14 to lubricate the sleeve bearing 18. The remainder of the oil spills out of the bottom of the hole 13 onto the crankgear 15. A part is transferred to the camshaft gear (not shown), and the rotating gears also sling oil outward to produce a fine oil mist which lubricates moving parts of the engine.

The lubrication system of the invention can continue to lubricate as long as there is sufficient oil to cover the bottom of the oil reservoir 27. However, it is desirable for any internal combustion engine to have an adequate reserve of oil, so that the engine can be operated for long periods without adding to the oil supply, and so that the contaminate content per volume of oil is kept at low values. Thus, it can be seen that provision must be made for a goodly sized oil storage area, and in the invention such storage, in the form of the reservoir 27, is at the side of the engine so that the usual sump in the bottom of the reservoir can be eliminated. This gives the advantage of reduced engine height and a shorter crankshaft, whereby the main bearing supports for the crankshaft can be spaced closer together. Transverse moments acting upon the crankshaft can accordingly be reduced to enhance engine operation.

Advantageously, the engine lubrication system of the invention permits running the engine at angles in which the normally upright crankshaft can be at a substantial deviation from the vertical. To this end, the baffle 37 insures retention of a sufficient quantity and depth of oil at the intake duct 32 to maintain flow from the crankcase to the reservoir 27. For example, when the cylinder end of the engine is tilted downward, oil that is impinged against the wall of the inner shell 28 by the slinging action of the crankgear 14 and camshaft gear (not shown), flows down into the area partially encircled by the baffle 37 to be captured and retained thereby in a pool of adequate depth.

During initial start of the engine, particularly in cool weather, the lubricating oil may be sluggish and difficult to move. To aid the buildup of adequate pressure in the reservoir 27 under such conditions, the small opening 34 in the intake duct 32 will pass a greater amount of air than normal, to make up for the deficiency of oil flow, and such air will be passed through the valve 33 and to the reservoir 27 during maximum pressure pulses to develop the desired reservoir pressure. Such air also provides a pressure for moving the oil that is present upward through the inlet passage 31 to the top of the reservoir. Thus, the provision of an air hole in the inlet passage 31 at a point upstream from the oil pool in the sump, but at a location in the direction of oil flow that is before the check valve 33, is of particular use under engine starting conditions.

In accordance with the invention, an adequate supply of lubricating oil to the moving engine parts is assured by the combined action of the check valve 33 and thrust bearing 19 with pulsating pressure differentials between the crankcase 2 and the separate oil reservoir 27. It is contemplated that the lubrication system of the invention can be used with other types of reciprocating internal combustion engines, and is not necessarily limited to vertical crankshaft reciprocating engines. Also, the term vertical as used herein is not limited to an exact vertical position. It is to be understood, therefore, that the foregoing embodiment of the invention is shown by way of illustration and not of limitation of the scope of the invention.

I claim:

1. In a lubrication system for a reciprocating internal combustion engine having moving parts to be lubricated and including a crankcase, a crankshaft rotatably mounted in the crankcase, a cylinder communicating with the crankcase, a piston in the cylinder that creates pulsating pressures in the crankcase as it reciprocates, and a connecting rod tying the piston and crankshaft to one another, the combination therewith of:

a separate reservoir for holding lubricating oil;

a first passage for lubricating oil leading from said crankcase to said reservoir which includes means to block the lubricating oil from returning to said crankcase;

said first passage including an oil intake duct, the duct having an opening which extends into lubricating oil collected in the bottom of said crankcase, and also having an inlet for air positioned above the oil level in said crankcase and leading from said crankcase to said first passage, such inlet for air being in a position, with respect to the direction of oil flow, that is forward of said means associated with said first passage for blocking lubricating oil;

an air bleed opening extending from said reservoir back to said crankcase;

a second passage for lubricating oil leading from said reservoir and having an outlet entering into said crankcase;

means at the outlet of said second passage that conducts the oil into the crankcase and which blocks the oil from returning to said reservoir; and means distributing the oil to the engine parts to be lubricated.

2. In a lubrication system for a reciprocating internal combustion engine having moving parts to be lubricated and including a crankcase, a crankshaft rotatably mounted in the crankcase, a cylinder communicating with the crankcase, a piston in the cylinder that creates pulsating pressures in the crankcase as it reciprocates, and a connecting rod tying the piston and crankshaft to one another, the combination therewith of:

a separate reservoir for holding lubricating oil;

a first passage for lubricating oil leading from said crankcase to said reservoir, said first passage comprising an oil intake duct that has an opening which extends into lubricating oil received in the bottom of said crankcase, and also having an inlet for air positioned above the oil level in said crankcase and leading from said crankcase to said first passage, such inlet for air being in a position, with respect to the direction of oil flow, before said means associated with said first passage for blocking lubricating oil;

means associated with the first passage to block the lubricating oil from returning to said crankcase;

a second passage for lubricating oil leading from said reservoir and having an outlet entering into said crankcase;

means at the outlet of said second passage that conducts the oil into the crankcase and which blocks the oil from returning to said reservoir;

means distributing the oil to the engine parts to be lubricated; and baffle means provided in the crankcase bottom to at least partially surround said opening of the intake duct, said baffle means developing and maintaining a sufficient quantity of lubricating oil at said intake duct opening to allow said engine to be operated at angles of tilt.

3. In a lubrication system for a reciprocating internal combustion engine having moving parts to be lubricated and including a crankcase, a crankshaft rotatably mounted in the crankcase, a cylinder communicating with the crankcase, a piston in the cylinder that creates pulsating pressures in the crankcase as it reciprocates, and a connecting rod tying the piston and crankshaft to one another, the combination therewith of:

a separate reservoir for holding lubricating oil;

a first passage for lubricating oil leading from said crankcase to said reservoir;

means associated with the first passage to block the lubricating oil from returning to said crankcase;

a second passage for lubricating oil leading from said reservoir and having an outlet entering into said crankcase;

means at the outlet of said second passage that conducts the oil into the crankcase and which blocks the oil from returning to said reservoir, said means at the outlet of said second passage comprising a bearing mounted on said crankshaft, said bearing including an inner race, an outer race and spaced bearing elements arranged therebetween, such bearing elements being mounted for rotation with the crankshaft, and a gap between said inner and outer races that receives oil from said outlet of said second passage, rotation of said bearing elements causing oil received in said gap to be thrust radially outward and into said crankcase; and means distributing the oil to the engine parts to be lubricated.

4. In a lubrication system for a reciprocating internal combustion engine having moving parts to be lubricated and including a crankcase, a crankshaft rotatably mounted in the crankcase, a cylinder communicating with the crankcase, and a piston in the cylinder that creates pulsating pressures in the crankcase as it reciprocates, the combination therewith of:

a separate reservoir for holding lubricating oil;

an oil inlet for the reservoir leading from the bottom of said crankcase to said reservoir;

valve means associated with said oil inlet that permits oil flow toward said reservoir in response to pressure in said crankcase and that prevents oil flow in the reverse direction during low pressure in said crankcase;

an air bleed opening extending from said reservoir back to said crankcase; and an oil outlet for said reservoir leading from said reservoir and entering said crankcase for delivering oil to engine parts to be lubricated.

5. A lubrication system as in claim 4 wherein, said oil inlet comprises an oil intake duct, the duct having an opening which extends downwardly into lubricating oil collected in a pool in the bottom of said crankcase and also having an inlet for air positioned above the oil level in said crankcase and leading from said crankcase to said first passage, such inlet for air being in a position, with respect to the direction of oil flow, that is forward of said valve means.

6. The combination of claim 4 which includes baffle means in the crankcase bottom that at least partially surrounds said opening of the intake duct for developing and maintaining a sufficient quantity of lubricating oil at the oil inlet of the reservoir at all times so that the engine can be operated at different angles of tilt from the vertical.

7. In a lubrication system for a reciprocating internal combustion engine having a crankcase, the combination of:

a lubricating oil reservoir forming a part of the engine which is separate from the crankcase interior;

an oil inlet passage for said reservoir leading from said crankcase into the reservoir;

a region in said crankcase to receive oil from said reservoir;

an oil outlet passage for said reservoir leading from said reservoir to said region; and a bearing for said crankshaft that is interposed between said region and the interior of said crankcase that has bearing elements that rotate with said crankshaft and centrifugally pump oil received from said region into said crankcase, the centrifugal action restraining oil from returning to said region or said outlet passage.

8. In a lubrication system for a reciprocating internal combustion engine having a crankcase, the combination of:

a lubricating oil reservoir that is separate from the crankcase interior;

an oil conducting inlet passage for said reservoir leading from said crankcase into said reservoir;

a region in said crankcase to receive oil from said reservoir;

an oil conducting outlet passage for said reservoir leading from said reservoir to said region; and a centrifugal pump device interposed between said region and the interior of said crankcase that receives oil from said region and pumps the same into said crankcase to create a unitary direction of oil flow without reverse flow back to said region or outlet passage.

9. In a lubrication system for a reciprocating internal combustion engine having a crankcase and a reciprocating piston that develops pulsating pressures within the crankcase, the combination of:

a one-way breather valve in said crankcase communicating with the exterior which admits air flow from within the crankcase to the exterior to develop an average negative pressure within said crankcase;

a lubricating oil reservoir separate from said crankcase;

an oil conducting inlet passage leading from within said crankcase to said reservoir;

a one-way valve in said inlet passage permitting oil flow from said sump to said reservoir in response to positive pressure pulses within said crankcase and permitting a pressure buildup within said reservoir that exceeds negative pressure pulses within the crankcase;

a region in an upper part of said crankcase to receive oil from said reservoir, from which region oil can descend in said crankcase while lubricating parts of the engine; and an oil conducting outlet passage leading from said reservoir to said region through which oil is transported to said crankcase in response to pressure differentials between said crankcase and said reservoir during portions of the piston reciprocation when reservoir pressure exceeds crankcase pressure.

References Cited

UNITED STATES PATENTS

| | | | |
|---|---|---|---|
| 1,871,760 | 8/1932 | Taub | 184—6 |
| 2,128,065 | 8/1938 | Aikman | 184—6 |
| 2,137,220 | 11/1938 | Aikman | 184—6 |
| 3,144,095 | 8/1964 | Trapp et al. | 184—6 |
| 3,195,526 | 7/1965 | Jordan | 184—6 XR |
| 3,318,644 | 5/1967 | Johnson | 184—6 XR |
| 3,367,447 | 2/1968 | Consoli et al. | 184—59 |

MANUEL A. ANTONAKAS, Primary Examiner

U.S. Cl. X.R.

123—196